Patented Oct. 23, 1934

1,977,627

UNITED STATES PATENT OFFICE 1,977,627

PROCESS OF PRODUCING DIPHENYLOL-PROPANE

Richard Greenhalgh, Blackley, Manchester, England, assignor to Imperial Chemical Industries Limited, a corporation of Great Britain No Drawing. Application January 13, 1933, Serial No. 651,640. In Great Britain January 21, 1932

5 Claims. (Cl. 260—64)

It is well known that diphenylolpropane may be obtained by the interaction of phenol with acetone in the presence of acid condensing agents. Previous workers, however, have either used an excess of phenol or an excess of acetone or the yields have been poor and the product contaminated with unchanged phenol. The processes described have consequently been unsuitable for technical operation.

We now find that an excellent yield of pure diphenylolpropane is obtained by a careful control and modification of the reaction conditions during the condensation.

According to the invention we effect condensation between equivalent quantities of phenol and acetone, using as condensing agent sulphuric acid preferably of about 70% strength by weight. We find that the strength of sulphuric acid must be between 65 and 75%, for if the strength is below 65% the reaction is very slow while above 75% excessive sulphonation of the phenol occurs. We also find it advantageous to employ a large proportion of condensing agent, namely, a weight of aqueous acid of the strength given at least three times and preferably four to seven times the weight of phenol. We thus readily obtain a larger yield of a purer and cleaner product.

It is also a further feature of the invention that the interaction is carried out at a temperature not exceeding 65° C. and preferably at a lower temperature, e. g. 40–50° C. The reaction takes place, but not very rapidly, at room temperature.

The use of sulphuric acid at the relatively low temperature prescribed is particularly advantageous technically, in that the operation may be carried out in a leaden vessel and the expensive apparatus indispensable when hydrochloric acid is used, is not needed.

The invention is illustrated but not limited by the following example.

63 lb. of phenol and 20 lb. of acetone are mixed in a vessel fitted with a condenser and 405 lb. of sulphuric acid (122° Tw.) are added gradually, the mixture being cooled during the addition. The mixture is stirred and maintained at 45–50° C. for six hours and then at 55–60° C. for a further twelve hours. The reaction product is cooled and filtered and the solid product washed with water and dried at 60° C. Pure diphenylolpropane was obtained in approximately 65–70% yield.

The use of boric acid in addition to sulphuric acid in the preparation of diphenylolpropane according to the process described above gives a product in better yields, lighter in color, and even less contaminated with sulphonic acids. This is disclosed in the co-pending application of James A. Arvin, Serial No. 652,565, filed January 19, 1933.

The above description is illustrative only. Any variation therefrom which conforms to the spirit of the invention is intended to be included within the scope of the claims:

I claim:

1. The process which comprises reacting phenol and acetone in the presence of sulphuric acid having a strength of 65–75% by weight.

2. The process which comprises reacting phenol and acetone in the presence of sulphuric acid having a strength of 65–75% by weight, the sulphuric acid being present in an amount by weight which is three to seven times that of the phenol.

3. The process which comprises reacting phenol and acetone in the presence of sulphuric acid having a strength of 65–75% by weight, the sulphuric acid being present in an amount by weight which is three to seven times that of the phenol, the reaction being effected at a temperature ranging from room temperature to 65° C.

4. The process which comprises treating about two mols of phenol and one mol of acetone, in admixture, with an aqueous solution containing 65–75% sulphuric acid by weight, the said solution being present in an amount which is from three to seven times by weight that of the phenol, at a temperature of 40–65° C.

5. The process which comprises treating about two mols of phenol and about one mol of acetone in the presence of an aqueous solution containing 65–75% sulphuric acid by weight, the said solution being present in an amount which is from three to seven times by weight that of the phenol, at a temperature ranging from room temperature to 65° C.

RICHARD GREENHALGH.